United States Patent

Bowerman

[15] 3,686,480

[45] Aug. 22, 1972

[54] DATA PROCESSING CARD

[72] Inventor: William R. Bowerman, 2457 Jasu Dr., Lawrence, Kans. 66044

[22] Filed: April 1, 1971

[21] Appl. No.: 130,172

[52] U.S. Cl. .......................................... 235/61.12 N

[51] Int. Cl. .......................................... G06k 19/06

[58] Field of Search..235/61.12 R, 61.12 N, 61.11 E, 235/61.11 R, 61.7 B; 340/149 A; 250/219 D, 225

[56] References Cited

UNITED STATES PATENTS

| | | | |
|---|---|---|---|
| 2,497,405 | 2/1950 | Glover | 250/225 |
| 2,536,155 | 1/1951 | Brand | 235/61.12 R |
| 3,399,473 | 9/1968 | Jaffe | 235/61.12 R |
| 3,571,596 | 3/1971 | Frank et al | 250/219 D |

*Primary Examiner*—Daryl W. Cook
*Attorney*—Morse, Altman & Oates

[57] ABSTRACT

A data processing card is provided with one or more apertures each with a window rotatably mounted with respect thereto. The window may be of polarizing material or bear an indicating arrow or the like. Information is set into the card by rotating each window to selected angle conveniently done with a pencil applied to a tab attached to the window and registerable with indexing marks on the card. Two or more cards can be superimposed one upon the other with their apertures aligned. By illuminating the stack of cards from the rear, the information on the several cards can be examined from the front for matching and mismatching of information. If a bit of information on one card corresponds with the bit of information on the other card in a corresponding window, their polarizing filters will be oriented in the same manner and light will pass. If the information bits are different, the filters will be differently oriented and light will be blocked.

5 Claims, 4 Drawing Figures

INVENTOR
WILLIAM R. BOWERMAN
BY Moses, Altman & Oates
ATTORNEYS

DATA PROCESSING CARD

BACKGROUND OF THE INVENTION

1. Field of the Invention

This invention relates generally to data processing cards and more particularly is directed towards a manually adjustable data card employing rotary windows such as polarizing filters as the coding medium.

2. Description of the Prior Art

Most data processing cards currently in use are punched in some coded fashion or have magnetic material on which information is prerecorded. These cards customarily are read by data processing equipment in which the coded data on the card is scanned.

Conventional data processing cards are designed for use primarily with specialized automatic computer equipment by which data is encoded on the cards and subsequently read out at high speed. These cards generally are not re-useable and are discarded once they have served their purpose.

It is an object of the present invention to provide improvements in data processing cards and more particularly to provide data processing cards that may be used without specialized equipment and which may store different information in re-use. A further object of this invention is to provide data processing cards that may be used for a variety of purposes including a part of a game.

SUMMARY OF THE INVENTION

This invention features data processing cards formed with at least one aperture therethrough and a window, preferably of polarizing material rotatably mounted to the card across the aperture and bearing angular position encoding indicia in the form of a tab or the like. The card is provided with angularly spaced markings about the aperture against which the window tab is aligned to store an encoded bit of information. By illuminating one side of a stack of individually encoded cards, matching and mismatching bits of information in aligned windows may be observed from the opposite side of the stack, depending upon the orientation of the polarizing axes of the aligned windows being parallel or mutually perpendicular. Light will pass through in one instance but not in the other.

DETAILED DESCRIPTION OF THE PREFERRED EMBODIMENTS

Figures 1, 2, 3:
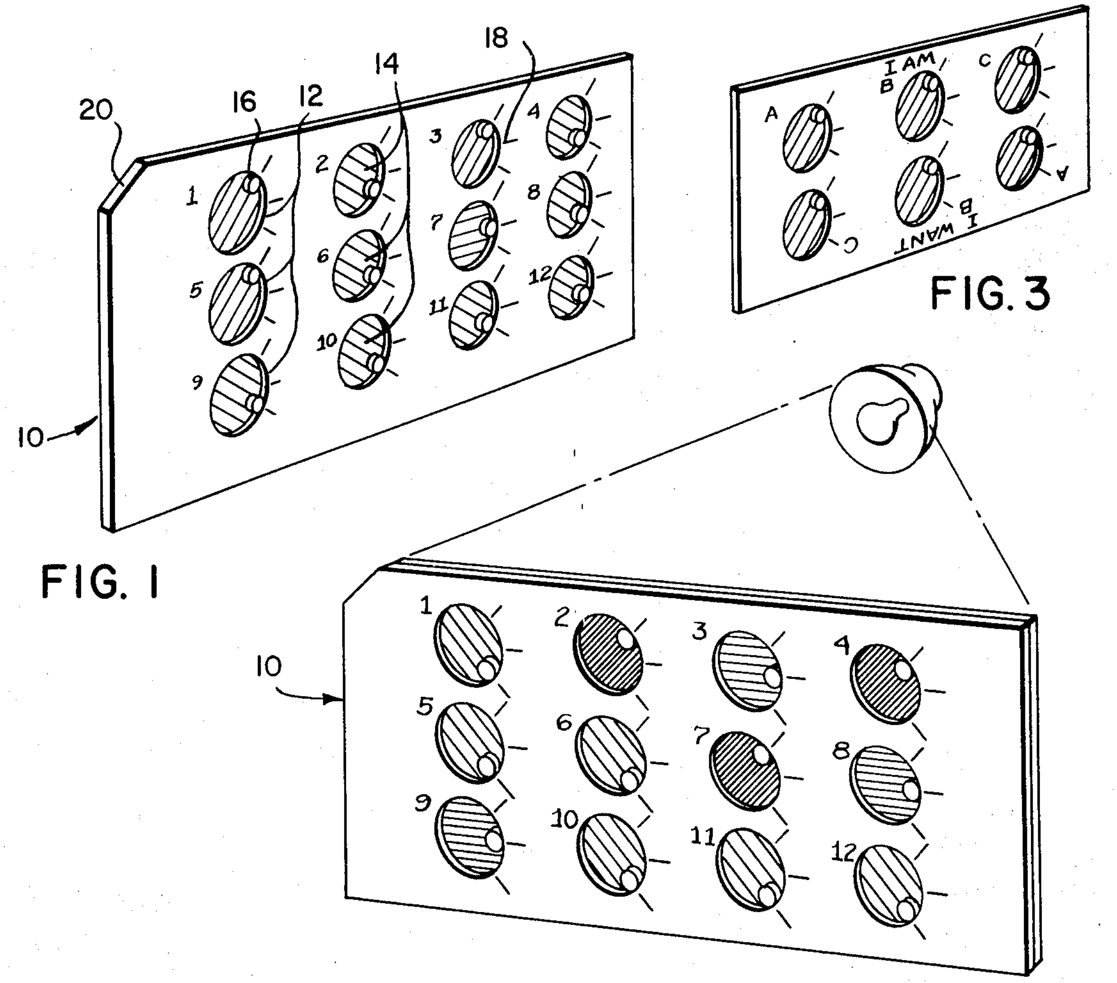
FIG. 1 is a view in perspective of a data processing card made according to the invention.
FIG. 2 is a view in perspective showing two superimposed cards illuminated for data comparison purposes.
FIG. 3 is a perspective view of a modification of the invention, and, FIG. 4 is an exploded view in perspective showing details with respect to an aperture and window arrangement.

Referring now to the drawings, the reference character 10 generally indicates a data processing card made according to the invention, the card typically being rectangular in outline and formed with one or more apertures 12 each having a window 14 rotatably mounted to the card 10. Each window 14 is provided with means for facilitating manual rotation of the window within an aperture and, in the embodiment of FIGS. 1 and 2, a boss in the form of a knob 16 is provided near the periphery of the window and extending outwardly from the face of the card whereby the knob may be grasped and the window moved as desired. Indexing marks 18 or preprinted material appears on the face of the card in spaced angular position adjacent each aperture.

In the preferred form of the invention, each window 14 is fabricated from a light polarizing material, the polarizing axes of the various windows being in the same relative position with respect to the knobs so that when all knobs are in the same angular position, the polarizing axes will be parallel. The card may also be formed with a notched corner 20 so that stacked cards may be easily aligned.

Information is set into the card by rotating a window to a selected angular position, the knob 16 being opposite a selected indexing mark 18 representing a particular bit of information. For example, if the card were being used as an educational device or as a game, multiple choice questions may be answered by aligning the knob with a selected index mark on the card corresponding to one of several possible answers. As a game, the cards may be used to determine degrees of compatibility between two individuals, their preferences, personal traits, backgrounds, etc., being encoded on separate cards with the position of the knob corresponding to a particular personal factor. In either event, once the information has been set into the cards by positioning all of the windows, one card is superimposed over another and the stacked cards are then illuminated from the rear as suggested in FIG. 2. By observing the front face of the stacked cards matching and mismatching answers may be readily observed insofar as the windows of matching answers will pass light since their polarizing axes will be parallel whereas the windows of conflicting answers will block light insofar as their polarizing axes will be perpendicular.

It will be understood that when the cards are superimposed one upon the other the windows of one card will register with the corresponding windows of the other card. The information on both cards will, of course, be distributed in the same relative position so that comparisons may be made by simply overlaying one card on the other. By way of example, in FIGS. 1 and 2, 12 windows are provided and these may be numbered to correspond with twelve questions for example in a multiple choice exam. All cards will be similarly numbered and a teacher may employ a master card with all of the correct answers preset to readily determine correct or incorrect answers which each student will have set into his own card. The student's card is matched against the teacher's master card in the fashion shown in FIG. 2 for scoring purposes. When used as a compatibility card, information with respect to an individual's personality traits may be set into one card and matched against information with respect to personal traits set into another card so that a couple, for example, may quickly determine the degree of mutual compatibility.

The cards may be used as part of a formal or informal information game in which two or more people may determine how similar they are in their opinions, beliefs, attitudes, etc. A compatibility card may contain a number of rotatable windows each identified with a particular statement or question. The participant may indicate his or her response or answer to an item by rotating a window to the position where its marker is opposite an index mark on the card corresponding to the answer he intends to give. When the participants have answered all items on their respective cards, each person's card will have the polarized filters in positions which indicate or represent how he or she feels about the subjects on the card. Since the same items are repeated in the same location on both cards, the participants can determine the extent of their compatibility by simply superimposing the cards in front of the light so as to observe how many apertures pass light and how many are dark. If the responses to a particular answer are the same, the aperture will be transparent whereas the aperture will be dark if the answers conflict since the polarizing axes of the superimposed filters will be parallel in the first case and perpendicular in the second case. If the responses are different but nearly the same, close-to-matching information is indicated by intermediate darkness of the aperture.

In addition to use in matching compatible characteristics of persons, the cards may be used to determine complementary characteristics. In FIG. 3, for example, each card is formed with two horizontal rows of rotatable windows, the upper row serving to encode the characteristics of the first person and the lower row serving to encode characteristics which the first participant desires in another. Two participants may prepare separate cards and by inverting one with respect to the other, the complementary characteristics of the two participants may be observed. Each participant can see if the other has the characteristics which he wants him to have.

Figure 4:
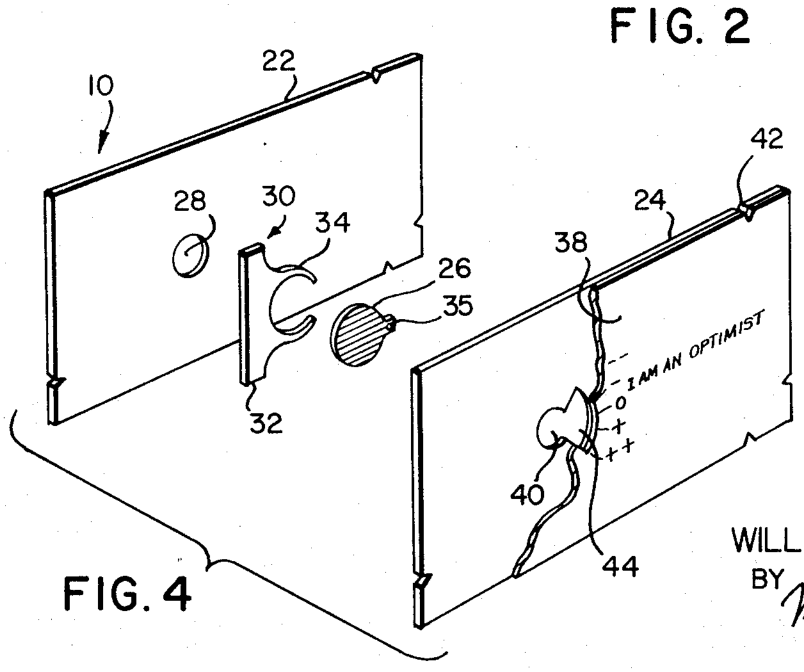

Referring now to FIG. 4, there is illustrated a modification of the invention and in this embodiment a data processing card 10' is comprised of front and rear panels 22 and 24 adapted to be superimposed over one another and between which is rotatably mounted a window 25, preferably of a light polarizing filter material. The rear wall 22 is formed with one or more circular apertures 28, the number of apertures depending upon the information capacity desired for a card. In FIG. 4, only one aperture is shown for the sake of simplicity. Attached to the inner face of the rear wall 22 adjacent the aperture 28 is a window mount 30, typically molded of plastic or the like, and formed with a leg portion 32 which may be cemented or otherwise secured to the wall 22 generally tangential to the aperture 28. The mount is also formed with a C-shaped portion 34 adapted to receive the circular filter 26. The filter 26 preferably is formed with a tab 35 extending radially outward therefrom between the terminal ends of the C-shaped portion 34. The ends of the C-shaped legs act as stops for the tab 35 permitting approximately a 90° rotary movement of the filter within the mount. The tab 35 preferably is formed with a small central indent by which a pencil or other similar device may be used to rotate the filter to a particular position. The tab also serves as a convenient reference mark by which the filter may be aligned with response position markings imprinted on a separate cover sheet 38 superimposed over the outer face of the wall 24.

The wall 24 is formed with an aperture 40 having a circular portion in registration with the aperture 28 of the rear wall and also is formed with an arcuate offset portion positioned to expose the tab 34 for access by a pencil or other device. The two walls 22 and 24 may be secured by any suitable means such as cementing, pressure sensitive adhesive tape or they may be detachably connected by rubber bands looped about the walls and retained in position by notches 42 formed in the edges of the walls.

The facing sheet 38 may be made of paper and bear imprinted or written thereon any one of a variety of different questions, statements or the like opposite each aperture. Various symbols may also be printed adjacent an opening 44 similar in size and shape to the aperture 40 in the wall 24 and adapted to register with that opening when superimposed over the card. The sheet 38 similarly may be held detachably by rubber bands or the like and may be replaced with other sheets printed with different questions or statements so that the same card may be used any number of times.

Instead of making the windows so that they may be reset, they may be made to remain permanently set once in position. Also, in place of polarizing materials, the windows may be of transparent material and bear an arrow or the like which can serve as a visual indicator for matching cards.

Having thus described the invention what I claim and desire to obtain by Letters Patent of the United States is:

1. A data processing card, comprising a. a wall formed with at least one aperture therethrough, b. a window rotatably mounted to said wall across each aperture, c. said window being formed of light polarizing material, d. first reference means on said window for indicating the angular position thereof, and, e. second reference means on said wall angularly spaced about said aperture.

2. A data processing card according to claim 1 wherein said wall includes a pair of superimposed front and rear panels, said rear panel being formed with at least one circular aperture therein, a flat C-shaped holder mounted to the inner face of said rear panel with the C-shaped portion concentric with said aperture, said window being formed with a circular portion mounted within said C-shaped portion and a radial tab extending outwardly therefrom, said front panel being formed with a circular aperture in registration with said window and said rear panel aperture and an arcuate opening in communication therewith to expose said tab.

3. A data processing card according to claim 2 wherein said tab is formed with an indent therein.

4. A data processing card according to claim 1 including an information bearing sheet detachably mounted to the outer face of said front panel and formed with apertures corresponding in size, shape and number with the apertures in said front panel.

5. A data processing card according to claim 1 wherein said wall is formed with a plurality of apertures arranged in at least two parallel rows, said apertures being evenly spaced and distributed whereby the apertures of similar cards will be in registration when superimposed in either of two positions.

* * * * *